United States Patent [19]

Marx

[11] Patent Number: 4,768,553
[45] Date of Patent: Sep. 6, 1988

[54] TIMED SHUT-OFF MIXING WATER VALVE

[75] Inventor: Howard B. Marx, Auburn Township, Geauga County, Ohio

[73] Assignee: Imo Delaval Inc., Princeton, N.J.

[21] Appl. No.: 145,326

[22] Filed: Jan. 19, 1988

[51] Int. Cl.⁴ ............................................. F16K 11/07
[52] U.S. Cl. .......................... 137/625.17; 137/636.4; 251/20; 251/21
[58] Field of Search .......... 137/625.17, 636.2, 636.3, 137/636.4, 624.11, 624.12; 251/20, 21, 22, 23

[56] References Cited

U.S. PATENT DOCUMENTS

| | | | |
|---|---|---|---|
| 3,530,889 | 9/1970 | Spencer | 137/636.2 X |
| 4,050,475 | 9/1977 | Watts | 137/625.17 |
| 4,285,361 | 8/1981 | Lissau | 251/21 X |
| 4,569,369 | 2/1986 | Rinkewich | 251/20 X |

Primary Examiner—Alan Cohan
Attorney, Agent, or Firm—Hopgood, Calimafde, Kalil, Blaustein & Judlowe

[57] ABSTRACT

A ball clutch mechanism couples a faucet knob to the splined end of a valve stem for releasing the valve stem when the knob is fully depressed. A dashpot damped return spring urges the valve stem toward valve closed position when the clutch mechanism releases. The same dashpot controlled return spring closes the valve if the knob is released either before or after full travel inward. Rotation of the knob rotates the valve stem to determine water temperature by mixing hot and cold supplies. Check valves control passages that are provided to vent the lines during fluid flow and to drain the lines when the system is serviced.

11 Claims, 5 Drawing Sheets

TIMED SHUT-OFF MIXING WATER VALVE

BACKGROUND OF THE INVENTION

The present invention relates to a mixing water valve and particularly to a valve for a lavatory sink or the like where water usage is desirably rationed.

Aboard aircraft, for example, the water supply is limited and it is necessary to restrict or ration water usage in order to avoid waste and ensure that the supply will last throughout a given trip. Self-closing valves for control of a single supply, hot or cold, are well known. However, it is believed that no such valve has been conceived prior hereto that is self-closing even though its operating knob or handle is held depressed or actuated, particularly where the valve is also capable of mixing hot and cold water.

It is, therefore, an object of the present invention to provide a timed shut-off mixing water valve which closes a given time after opening regardless of whether its input-control actuator is in actuated or released condition.

A further object is to provide a so-called "single lever" water valve that has a timed shut-off operative independently of release of the valve actuator.

Another object of the present invention is to provide such valve with an economical construction.

SUMMARY OF THE PRESENT INVENTION

In accordance with the present invention there is provided a timed shut-off mixing water valve comprising in combination a valve housing including first and second inlet ports for hot and cold water supply and an outlet port; a longitudinal valve stem having a valve control passage and at least two degrees of freedom one of which affects the communication between said control passage and said inlet ports and the other of which affects the communication between said control passage and said outlet port for respectively determining outlet water temperature and flow rate; spring biasing means coupled to said valve stem for urging said valve stem toward valve closed position with said control passage out of communication with at least either said inlet ports or said outlet port; an operating member; clutch means interconnecting said operating member with said valve stem, said clutch means being operatively enqaged over an initial range of travel and being disengaged upon travel beyond said initial range; and means operatively coupled to said valve stem for timing the spring biasing means movement of said valve stem to valve closed position, whereby said valve closes a given time after opening regardless of whether said operating member is released or not.

BRIEF DESCRIPTION OF THE DRAWINGS

The invention will be better understood after reading the following detailed description of the presently preferred embodiments thereof with reference to the appended drawings in which.

The same reference numerals are used throughout the drawings to designate the same or similar parts.

DETAILED DESCRIPTION OF THE PRESENTLY PREFERRED EMBODIMENT

Figure 1:
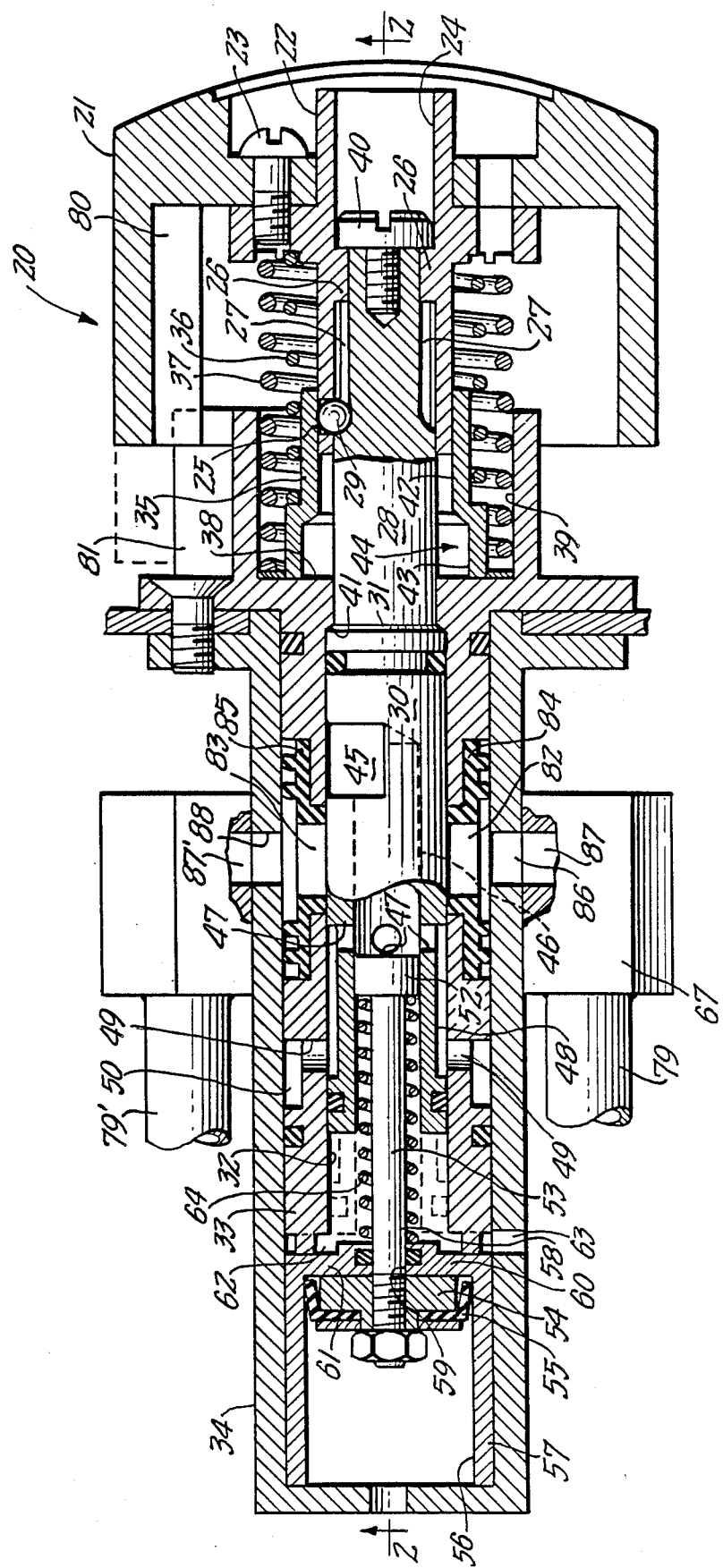
FIG. 1 is a longitudinal sectional view of a mixing water valve embodying the present invention and showing the valve in valve-shut position.
Figure 2:
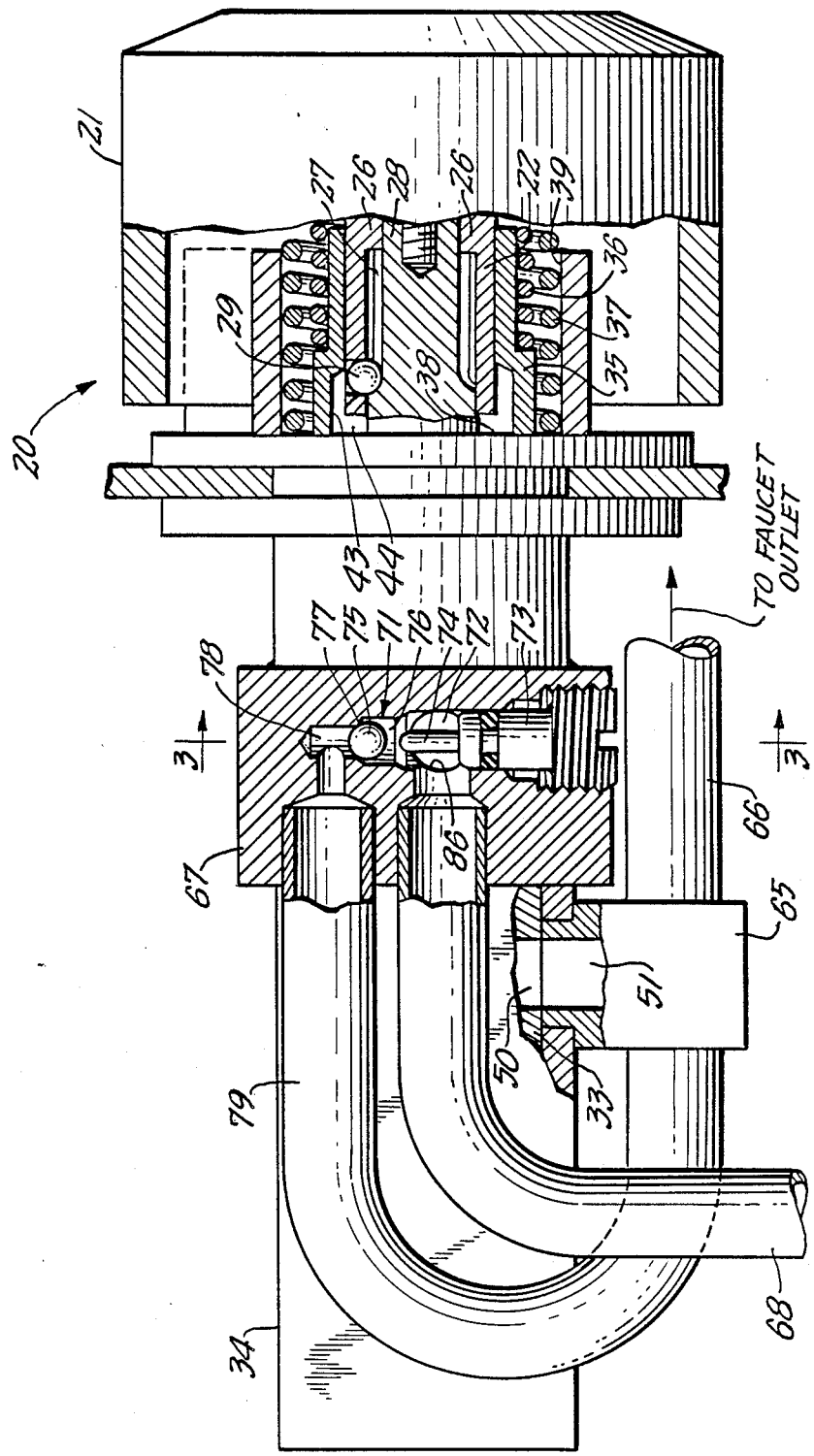
FIG. 2 is a side elevational view of the valve of FIG. 1 with portions broken away and with the actuator knob depressed to a point slightly short of maximum travel just before disengagement of the clutch mechanism.
Figure 3:
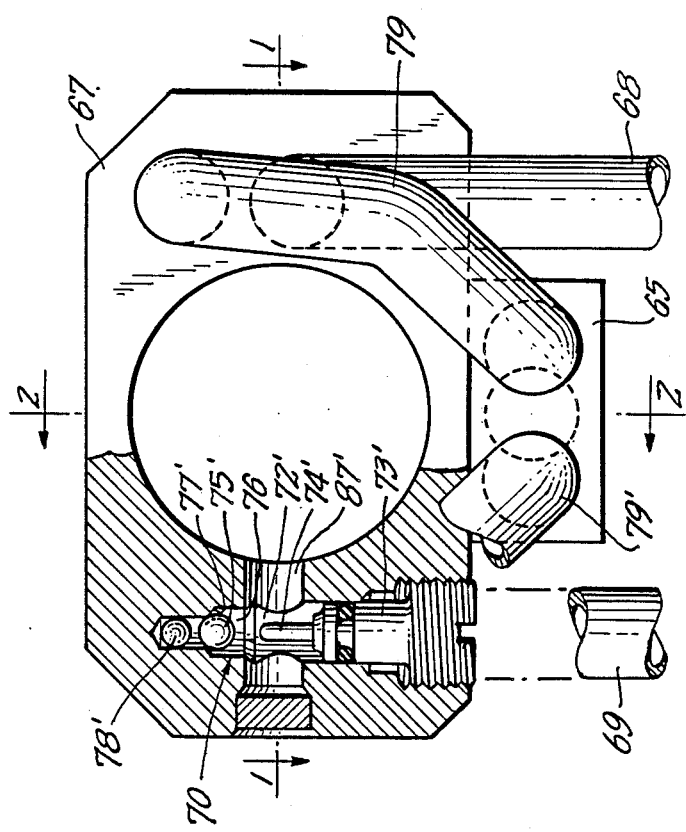
FIG. 3 is a partial sectional view as seen in the direction of the arrows 3—3 in FIG. 2.

Referring to the drawings, and particularly to FIGS. 1, 2 and 3, the valve, designated generally by the reference numeral 20, has an operating or actuating handle or knob 21 secured to a handle insert 22 by suitable screws 23. The handle insert 22 has a through bore 24, and near one end a series of three ball receiving apertures 25, spaced equidistantly circumferentially. A series of spline keys 26 are disposed in a circumferential array projecting radially inwardly from the handle insert 22 generally midway within the bore 24.

Figure 9:
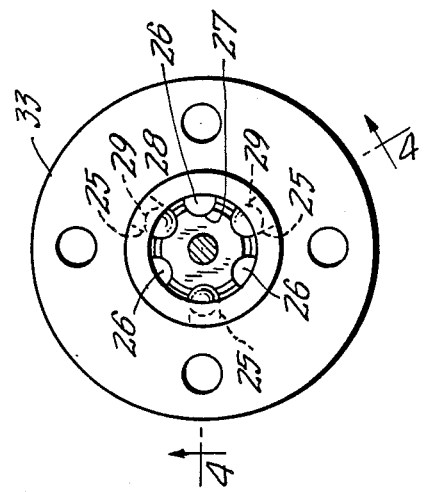

Spline keys 26 project into spline grooves 27 formed in the end of a valve stem 28. The diameter of bore 24 is chosen so that handle insert 22 makes a sliding fit about the valve stem 28. A plurality of clutch balls 29 ride one in each of the apertures 25, and, in the position of the valve shown in FIG. 1, the balls 29 also ride in a corresponding one of the spline grooves 27. In the present example, three equally spaced balls 29 are used, see FIG. 9, and engage three of the spline grooves. However, theoretically more than three apertures 25 and balls 29 can be employed, if desired.

The valve stem 28 is formed with a slightly enlarged diameter section 30 that extends from an end opposite the spline end up to a shoulder 31 and rides with a sliding fit within the bore 32 of a valve sleeve 33, which, in turn, is disposed with a close fit within a valve body 34.

Surrounding the extremity of the handle insert 22 is a cylindrical collar 35 that is biased away from handle insert 22 by a suitable compression type collar spring 36.

The handle insert 22, in turn, is biased by compression handle spring 37 toward the right as seen in FIG. 1 away from the bottom 38 of the counterbore 39 in sleeve 33.

A stop screw 40, threaded into the end of valve stem 28, prevents separation of the handle insert 22 from stem 28. However, spring biased urging of insert 22 away from sleeve 33 is halted when shoulder 31 on stem 28 encounters a shoulder 41 within the bore 32 of sleeve 33.

The collar 35 has an internally stepped diameter, the smaller diameter bore 42 fitting with a sliding fit the O.D. of the handle insert 22, and the larger diameter bore section 43 providing a cavity 44 for a purpose to be described below.

Valve stem 28 has a water mixing notch 45 that communicates with a longitudinal passage or bore 46 which leads, in turn, to a series of lateral apertures 47. A reduced diameter section 48 of the stem 28 cooperates with bore 32 of sleeve 33 to establish a channel that interconnects apertures 47 with apertures 49 in sleeve 33 communicating with a channel 50 that leads to an outlet port 51 (see FIG. 2). The bore 46 in stem 28 is interrupted below apertures 47 by an enlarged end 52 of a rod 53, the opposite end of which mounts a piston 54 furnished with a cup seal 55 that rides within the counterbore 56 in a valve body insert 57. The enlarged end or head 52 is brazed to the valve stem 28 within bore 46. Rod 53 has a longitudinally short flat 58 located adjacent piston 54 and the rod passes through an opening 59 containing an O-ring seal in the bottom wall 60 of insert 57.

The wall 60 contains an orifice 61 communicating with a space 62 leading to an air vent opening 63 in the side of body 34. A compression spring 64 surrounds rod 53 and engages at one end the wall 60 of insert 57 and at its other end the enlarged end or head 52. Spring 64 functions as a return spring for valve stem 28.

As best seen in FIGS. 2 and 3, outlet port 51 communicates via a multi-port fitting 65 with conduit 66 that leads to a faucet (not shown). A vent block 67 is mounted around valve body 34 and serves to connect hot and cold water lines 68 and 69, respectively, through respective check valves, the one for the cold water line being shown at 70 in FIG. 3 and the one for the hot water line being identical and shown at 71 in FIG. 2.

Referring to FIG. 2, the hot water line 68 enters block 67 and opens into a cavity 72 sealed at one end by a plug 73 having a projecting finger 74 that prevents a float ball 75 from falling out of the cavity 76 to ensure that when the water supply is turned on and the cavity 72 fills, the ball 75 will float and rise into seal establishing engagement with a check valve seat 77. The downstream side of valve seat 77 consisting of a cavity 78 is connected by a conduit 79 to the fitting 65.

Since the check valve 70 is identical, the same reference numerals that were used to describe check valve 71 are used for valve 70, but distinguished by appending a prime to each.

Finally, handle 21 is provided with an internally projecting rib 80 that upon rotation of handle 21 serves to angularly position notch 45 relative to valve ports 82 and 83 in sleeve 33 which ports are provided with suitable seals 84 and 85, respectively. Port 82 communicates via an aperture 86 in valve body 34 with passage 87 in vent block 67 in communication with cavity 72 therein through which passes the supply of hot water. In similar fashion port 83 communicates via an aperture 88 in valve body 34 with passage 87 in vent block 67 in communication with cavity 72 therein through which passes the supply of cold water.

Operation of the water valve will now be described. For purpose of orientation and for ease in discussion it will be assumed that as viewed in FIG. 1, valve stem movement toward the left is movement "IN" or toward valve open position, while movement of the stem 28 to the right is movement "OUT" or toward valve closed position. As shown in FIG. 1, the valve 20 is in closed position with notch 45 oriented for all cold water. The handle 21 is pushed in to control the flow of water and rotated to control water temperature. The piston 54 and cup seal 55 functions within insert 57 as a pneumatic dashpot to time the closure of the valve.

Figure 5:
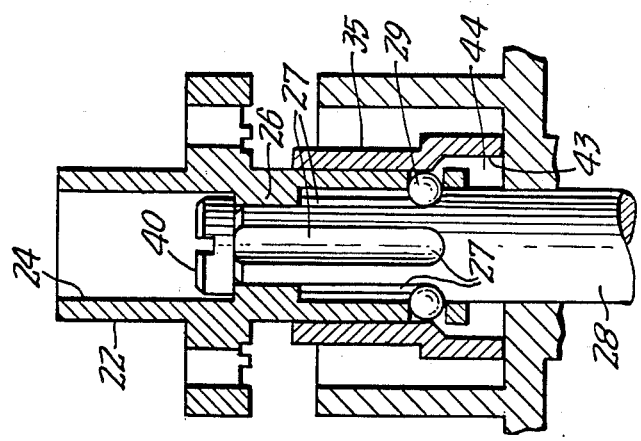
Figure 4:
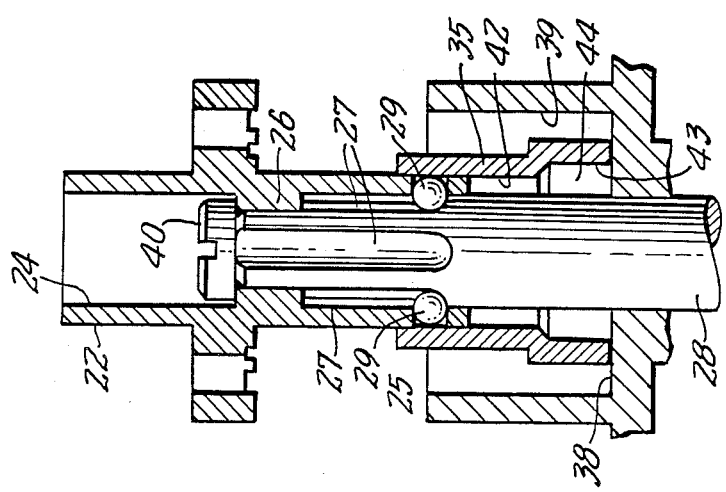

As the handle 21 is pushed in, handle insert 22, attached to the handle, travels inward also. With the sleeve 35 all the way in, the balls 29 are held captive within apertures 25 in insert 22 while projecting into spline grooves 27 thereby carrying stem 28 inward. FIG. 4 shows the full out or valve closed position while FIG. 5 shows the parts with insert 22 and stem 28 located just prior to the position where balls 29 are free to leave grooves 27 and project into the cavity 44 provided by the enlarged diameter section 43 of sleeve 35.

Figure 6:
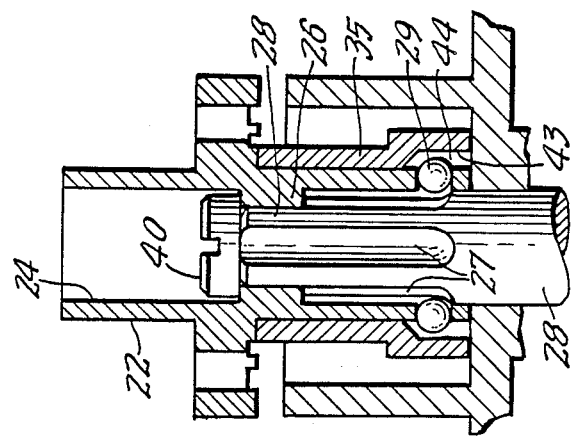
FIGS. 4 to 9 are a series of fragmentary views illustrating the clutch mechanism of the valve of FIG. 1 in different stages of operation with FIG. 9 being a top view and FIGS. 4 to 8 a series of longitudinal sectional views taken along the line 4—4 in FIG. 9.
Figure 7:
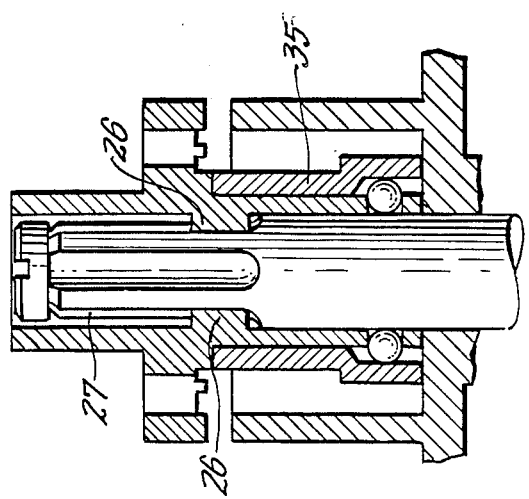

Further pressure on handle 21 will cause the parts to reach the relationship shown in FIG. 6 whereupon, even if external pressure remains on handle 21, spring 64 will start returning valve stem 28 to valve closed position. Initially the rate of valve closure will be determined by the rate at which air trapped to the right of cup seal 55 can escape through orifice 61 allowing the dashpot to move. At some point the flat 58 will pass the O-ring seal in opening 59 in wall 60 whereupon an enlarged passage will become open for rapidly venting the remaining air being compressed by piston 54 and the valve will snap shut. If handle 21 is still held depressed, the parts will be related as shown in FIG. 7.

Figure 8:
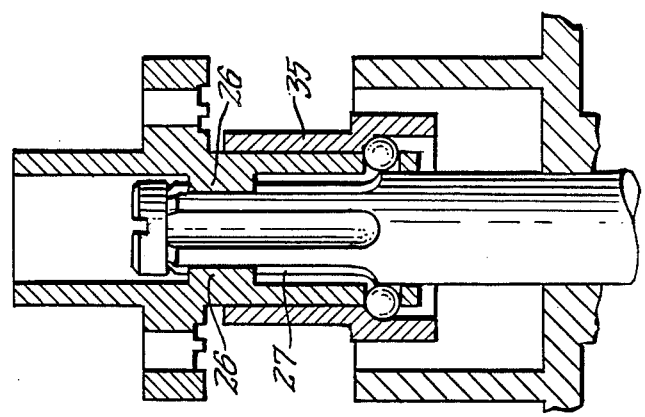

When handle 21 is released it is returned along with handle insert 22 to the outward position by spring 37. If the valve stem 28 is out as in FIG. 7, the sleeve 35 will be carried along with insert 22 as shown in FIG. 8 until balls 29 can re-enter corresponding grooves 27 in stem 28 whereupon sleeve 35 is released and returned by spring 36 to the initial position shown in FIGS. 1 and 4.

If handle 21 is released before valve stem 28 is full out, the spline keys 26 will encounter stop screw 40 and add to the spring bias on stem 28 to accelerate the closure of the valve. However, the dashpot arrangement will delay the closure for a reasonable period of time.

The vent block 67 is provided to permit total draining of the assembly. When the main water supply is interrupted the ball floats 75 and 75' will unseat and air from the conduit 66, admitted via the faucet, enters conduits 79 and 79' that connect vent block 67 with fitting 65. This permits any water in the valve and supply lines to be drained throuqh inlet water lines 68 and 69, assuming that said lines have been disconnected. When the system is re-connected, air trapped in the lines enters the water line 68 or 69 and travels through the open check valve (balls 75 and 75' are unseated), through air vent 79 or 79' and exits via the conduit 66 and attached faucet (not shown). Water entering via line 68 and 69 causes the ball float to seat and prevent water from leaving via the vent conduit 79 or 79'.

Having described the presently preferred embodiment of the invention it should be apparent to those skilled in the subject art that various changes in construction can be introduced without departing from the true spirit of the invention as defined in the appended claims.

What is claimed is:

1. A timed shut-off mixing water valve comprising in combination a valve housing including first and second inlet ports for hot and cold water supply and an outlet port; a longitudinal valve stem having a valve control passage and at least two degrees of freedom one of which affects the communication between said control passage and said inlet ports and the other of which affects the communication between said control passage and said outlet port for respectively determining outlet water temperature and flow rate; spring biasing means coupled to said valve stem for urging said valve stem toward valve closed position with said control passage out of communication with at least either said inlet ports or said outlet port; an operating member; clutch means interconnecting said operating member with said valve stem, said clutch means being operatively engaged over an initial range of travel and being disengaged upon travel beyond said initial range; and means operatively coupled to said valve stem for timing the spring biasing means movement of said valve stem to valve closed position, whereby said valve closes a given time after opening regardless of whether said operating member is released or not.

2. A timed shut-off mixing water valve according to claim 1, wherein said valve stem is rotatable to determine said water temperature and longitudinally moveable to determine said flow rate; and said clutch means comprises a sleeve, a key and keyway coupling between said sleeve in telescoped interrelationship with one end of said valve stem, and a plurality of clutch members coupling said sleeve to said valve stem, said operating member being operatively coupled to said sleeve for imparting both rotational and axial motion to said sleeve.

3. A timed shut-off mixing water valve according to claim 2, wherein said valve stem is disposed within a bore in a valve housing with said one end of said valve stem projecting from a wall of said housing, said one end of said valve stem being provided with a plurality of circumferentially spaced longitudinal keyway grooves, said sleeve surrounding said keyway grooves and including a plurality of individual circumferentially spaced keys each engaged in a different keyway groove, circumferentially spaced apertures in said sleeve adjacent the end of said sleeve that is proximate to said housing wall, a clutch ball of greater diameter than the wall thickness of said sleeve retained in each of said apertures, a second sleeve disposed telescopingly about said first sleeve and having a first end axially proximate to said housing wall and having an opposite end, said opposite end of said second sleeve being sized to make a sliding fit with said first sleeve for retaining said balls in a radially inward position, and said second sleeve first end being of larger diameter internally than said sleeve opposite end for permitting radially outward movement of said balls then said first sleeve is moved toward said housing wall.

4. A timed shut-off mixing water valve according to claim 3, wherein said means for timing the spring biasing means movement of said valve stem comprises a one-way acting air-operated dashpot means comprising an actuator stem joined at one end to said valve stem, a pneumatic piston connected to the opposite end of said actuator stem and having cup-seal engagement with a cylindrical-bore portion of said valve housing, and air-venting means including a bleed orifice for retarded release of air compressed by said piston at the urging of said spring biasing means.

5. A timed shut-off mixing water valve according to claim 1, wherein said valve stem is disposed within a bore in a valve housing with said one end of said valve stem projecting from a wall of said housing, said one end of said valve stem being provided with a plurality of circumferentially spaced longitudinal keyway grooves, said sleeve surrounding said keyway grooves and including a plurality of individual circumferentially spaced keys each engaged in a different keyway groove, circumferentially spaced apertures in said sleeve adjacent the end of said sleeve that is proximate to said housing wall, a clutch ball of greater diameter than the wall thickness of said sleeve retained in each of said apertures, a second sleeve disposed telescopingly about said first sleeve and having a first end axially proximate to said housing wall and having an opposite end, said opposite end of said second sleeve being sized to make a sliding fit with said first sleeve for retaining said balls in a radially inward position, and said second sleeve first end being of larger diameter internally than said sleeve opposite end for permitting radially outward movement of said balls when said first sleeve is moved toward said housing wall.

6. A timed shut-off mixing water valve according to claim 5, wherein said means for timing the spring biasing means movement of said valve stem comprises a one-way acting air-operated dashpot means comprising an actuator stem joined at one end to said valve stem, a pneumatic piston connected to the opposite end of said actuator stem and having cup-seal engagement with a cylindrical-bore portion of said valve housing, and air-venting means including a bleed orifice for retarded release of air compressed by said piston at the urging of said spring biasing means.

7. A timed shut-off mixing water valve according to claim 1, wherein said means for timing the spring biasing means movement of said valve stem comprises a one-way acting air-operated dashpot means comprising an actuator stem joined at one end to said valve stem, a pneumatic piston connected to the opposite end of said actuator stem and having cup-seal engagement with a cylindrical-bore portion of said valve housing, and air-venting means including a bleed orifice for retarded release of air compressed by said piston at the urging of said spring biasing means.

8. A timed shut-off mixing water valve according to claim 7, wherein said valve housing includes a partition wall through which passes said dashpot actuator stem and which wall closes off said cylindrical-bore portion of said valve housing, seal means surrounding said actuator stem and interposed between said actuator stem and said partition wall for establishing a pneumatic seal therebetween effective over a major range of travel of said actuator stem relative to said partition wall, and a section of said actuator stem provided with an area of reduced diameter which, due to its location longitudinally, is effective when aligned with said actuator-stem seal-means for providing a path around said last mentioned seal-means shortly before valve closure to bypass said bleed orifice and rapidly vent remaining air trapped by said piston and its cup-seal, whereby spring-biased return of said valve stem to valve-closed position is retarded for a certain time interval until closure approaches whereupon the retarding effect of said dashpot means is abruptly terminated permitting rapid completion of valve closure.

9. A timed shut-off mixing water valve according to claim 6, wherein said valve housing includes a partition wall through which passes said dashpot actuator stem and which wall closes off said cylindrical-base portion of said valve housing, seal means surrounding said actuator stem and interposed between said actuator stem and said partition wall for establishing a pneumatic seal therebetween effective over a major range of travel of said actuator stem relative to said partition wall, and a section of said actuator stem provided with an area of reduced diameter which, due to its location longitudinally, is effective when aligned with said actuator-stem seal-means for providing a path around said last mentioned seal-means shortly before valve closure to bypass said bleed orifice and rapidly vent remaining air trapped by said piston and its cup-seal, whereby spring-biased return of said valve stem to valve-closed position is retarded for a certain time interval until closure approaches whereupon the retarding effect of said dashpot means is abruptly terminated permitting rapid completion of valve closure.

10. A timed shut-off mixing water valve according to claim 4, wherein said valve housing includes a partition wall through which passes said dashpot actuator stem and which wall closes off said cylindrical-base portion of said valve housing, seal means surrounding said actuator stem and interposed between said actuator stem and said partition wall for establishing a pneumatic seal therebetween effective over a major range of travel of said actuator stem relative to said partition wall, and a section of said actuator stem provided with an area of reduced diameter which, due to its location longitudinally, is effective when aligned with said actuator-stem seal-means for providing a path around said last mentioned seal-means shortly before valve closure to bypass said bleed orifice and rapidly vent remaining air trapped by said piston and its cup-seal, whereby spring-biased return of said valve stem to valve-closed position is retarded for a certain time interval until closure approaches whereupon the retarding effect of said dashpot means is abruptly terminated permitting rapid completion of valve closure.

11. A mixing valve including elongate valve-body means having a longitudinal valve-stem guide bore with angularly spaced ports at a first longitudinal location for separate hot-water and cold-water inlet connections, said valve-body means having a water-outlet port at a second longitudinal location, a valve stem rotatably and longitudinally movably guided by said bore, said stem havinq an arcuate inlet-mixing notch at a locale intermediate limits of its guidance in said bore, said stem having a central bore communicating between said notch and a lateral outlet passage located between said notch and one end of said stem, and said lateral outlet passage having communication with said water-outlet port, whereby rotation and reciprocation of said stem relative to said valve-body member controls the relation of said notch to said ports to regulate quantity and temperature of water passing from said inlet ports to said outlet port, circumferential seal means between said valve stem and said valve-stem guide bore at separate longitudinal locations for controlling the flow of fluid between said inlet ports and said outlet port; and one-way acting air-operated dashpot means comprising an actuator stem joined at one end to said valve stem, a pneumatic piston connected to the opposite end of said actuator stem and having flap-seal engagement to a cylindrical-bore portion of said valve-body means, and air-venting means including a bleed orifice for retarded release of air compressed by said piston at the urging of said spring means.

* * * * *